3,179,337
HEATING AND COOLING CONTROL VALVES
Carl C. Bauerlein, Clearwater, Fla., assignor to The Dole Valve Company, Morton Grove, Ill., a corporation of Illinois
Filed Dec. 9, 1963, Ser. No. 328,836
2 Claims. (Cl. 236—1)

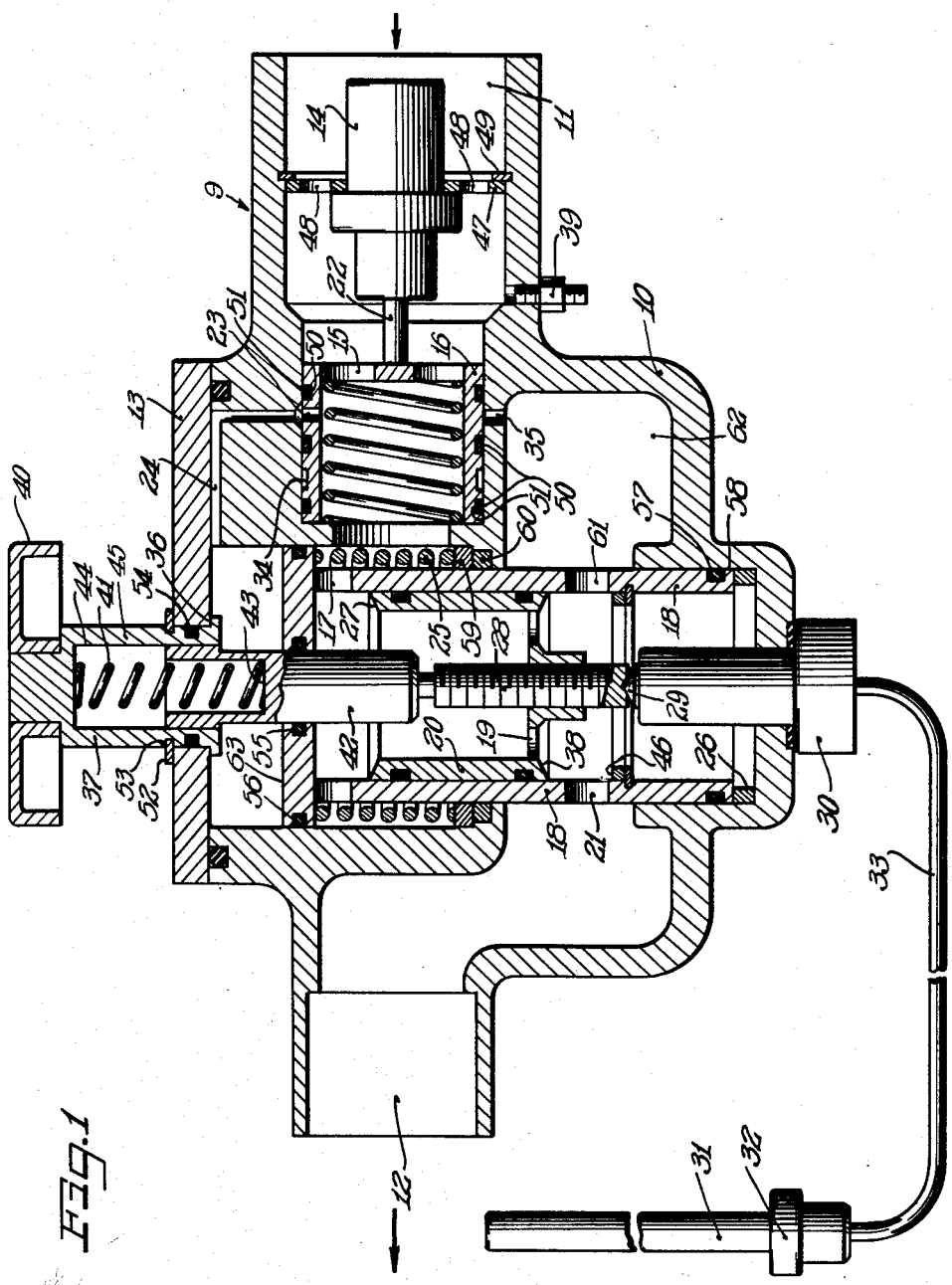

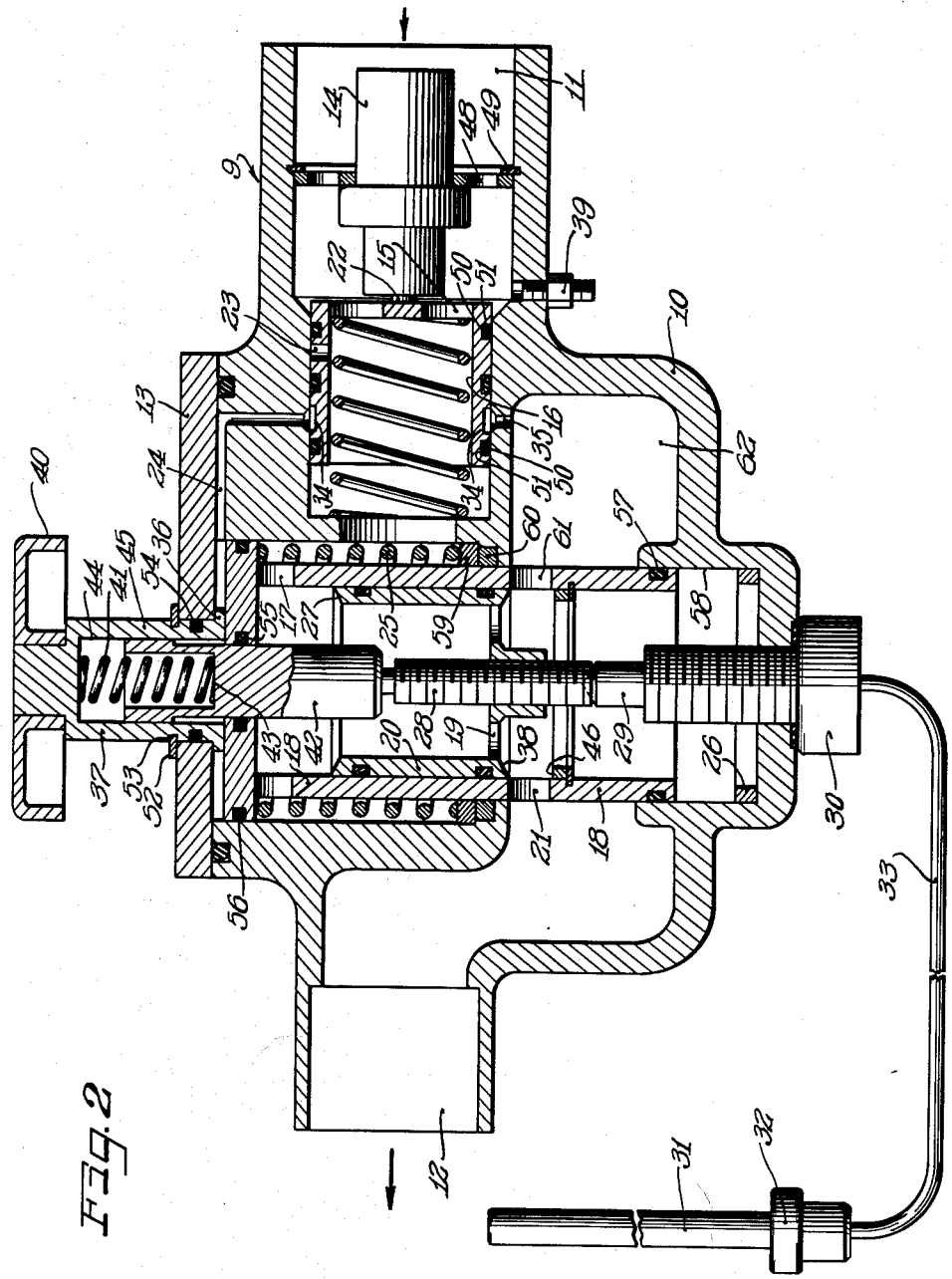

This invention relates to fluid control valves, and more particularly to a fluid control valve of the type operable by temperature. More particularly, the invention relates to a fluid control valve for use in a heating system or cooling system employing a thermal sensitive element to convert the valve from heating control to cooling control, and a thermal sensitive element to open and close the fluid path through the valve. This control is accomplished by means of movable sleeves upon which the thermal sensitive elements act.

Valves which can be operated automatically as a function of the temperature in a zone ambient the valve are commonly referred to as zone valves. Such valves can be employed to control the flow of heated or cooled liquid through radiators or the like. There is an increasing trend toward the usage of zone valves, particularly in apartments, and motels, as well as in large homes where single point thermostatic control of multiple heating units cannot satisfactorily correlate operation of those heating units with the varying temperatures in multiple rooms.

Recently, attempts have been made to use fluid circulating systems required to heat such living quarters in the winter in a second capacity as a circulating system for cooled liquid during the summer as air-conditioning. It has been found, however, that many thermostatically actuable fluid control valves are not adapted for use in such types of systems. A system which requires all of its valves to be removed and different valves inserted each time the seasons change is most undesirable.

Furthermore, a system which requires all of its room temperature sensitive sensing elements (such as thermostats, or the like) to be converted from heating control to cooling control is undesirable and time consuming.

It is, therefore, an object of the invention to provide a zone valve for use in a fluid circulating system which automatically converts itself to heating control and to cooling control.

It is a further object of this invention to provide a zone valve having a thermal sensitive element positioned within the fluid inlet so as to automatically convert the valve to heating control or to cooling control.

It is a further object of this invention to provide a zone valve having a fluid by-pass which permits a small amount of fluid to continuously flow through the valve thus maintaining the temperature of the fluid within the zone valve at the temperature of the fluid within the heating unit or cooling unit.

It is a further object of this invention to provide a zone valve which automatically controls the temperature of a predetermined living area, but which also may be manually adjusted to satisfy personal temperature requirements.

It is a further object of this invention to provide a zone valve which employs a number of movable sleeves to control the flow of fluid therethrough.

Briefly, the embodiment of the invention disclosed herein comprises a zone valve for use in a fluid circulating system of the type in which heated fluid is circulated in winter and chilled fluid is circulated in summer. This zone valve embodies a fluid by-pass which allows a small amount of fluid to continuously enter the valve inlet, pass through a chamber of the valve, then out of the valve. A temperature sensitive element is placed adjacent the by-pass so as to be responsive to the temperature of the fluid passing therethrough. The temperature sensitive element, if actuated, (as for example, upon response to heated fluid passing through the valve inlet) moves an inlet sleeve so as to convert the valve to heating control. A thermal sensitive element is also placed in the zone (or area to be temperature controlled) and provides the motive power for opening or closing the valve by moving an inner sleeve relative to ports in an outer sleeve. In addition, a rotatable knob is provided to manually adjust the valve when the valve is in the heating control position or the cooling control position.

The invention will be more fully understood from the following description of an embodiment thereof.

In the drawings:

FIGURE 1 is a cross-sectional view of the heating and cooling valve of the instant invention, showing the two thermal sensitive elements and their relationship with the movable sleeves which controls the flow of fluid through the zone valve. The valve is shown in the position it assumes for heating control.

FIGURE 2 is substantially the same as FIGURE 1, except with the valve in the position it assumes for cooling control.

Referring now to the drawings, in FIGURES 1 and 2 a valve 9 is shown having a body 10 with a cap 13 mounted thereon, and having an inlet 11 and an outlet 12. It should be noted at the outset that the valve 9 may be used in any position, and that the natural force of gravity does not affect its operation in any way. For the moment, however, in order to facilitate explanation of the operation of the valve 9, consider that the valve 9 has been installed in the position shown in FIGURES 1 and 2.

Fluid enters the valve 9 through the inlet 11 around a thermal sensitive element 14, through a port 15 in a slidable sleeve 16, through a first port 17 in an outer sleeve 18, through a number of ports 19 in an inner sleeve 20, through a second port 21 in the outer sleeve 18, to the outlet 12. A third port 61 in the outer sleeve 18 opens into a chamber 62.

Heated water flowing around the thermal sensitive element 14 causes a plunger 22 to be moved outwardly as shown in FIGURE 1, which in turn, aligns a hole 23 in the sleeve 16 with a passage 24 in the valve 9. Notice that the thermal sensitive element 14 is held in place by a mounting 47 having a number of ports 48 therein. The mounting 47 is secured within the inlet 11 by a ring 49. To prevent leakage of fluid between the inlet sleeve and the valve body, a number of O-rings 50 are provided, each in a recess 51 in the sleeve 16. Heated fluid enters the hole 23 in the sleeve 16 and is diverted through the passage 24 to a top surface 63 of the outer sleeve 18. The pressure of the heated fluid exerts a downward force on the surface 63, and pushes the outer sleeve 18 downward, compressing a coil spring 25, until the lower end of the outer sleeve 18 comes against a stop 26. Metering of the heated fluid is accomplished by an upper edge 27 of the inner sleeve 20 and it is moved to block the ports 17 when the inner sleeve 20 (and a threaded portion 28 of a shaft 42 upon which the sleeve 20 is mounted) is moved upwardly by a plunger 29 which extends from an actuator 30. Leakage of fluid past the upper end of the outer sleeve 18 is prevented by an O-ring 56 around the outer periphery of the upper end of the outer sleeve 18 and an O-ring 55 around the shaft 42. At the lower end of the outer sleeve 18, an O-ring 57 prevents leakage of fluid between a cylindrical recess 58 and the outer sleeve 18. A pair of guide members 59 and 60 insure that the outer sleeve 18 moves smoothly in a vertical direction. Preferably, both the outer sleeve 18 and the inner sleeve 20 should be constructed so as not to be rotatable relative to each other or relative to the valve 9. This can be accomplished by any suitable technique, such as splines and grooves or the like (not shown).

A remote sensing thermostat is provided for effecting movement of the sleeve 20 within the valve body. This thermostat comprises an actuator casing 30 which is fitted in sealed relation through an aperture formed through one wall of the valve body anud which is connected through a capillary 33 with a remotely disposed thermal sensing subassembly. The thermal sensing subassembly includes a casing 32 which may have a diaphragm extending across the interior thereof to confine the fluid carried within the capillary 33 and which has a sensing bulb 31 extending therefrom which, in turn, may carry a thermally expansible microcrystalline wax or some other suitable substance which has thermal expansion characteristics that would make it suitable for use in controlling the operation of a zone valve. When the temperatures ambient the sensing bulb 31 rise above the critical temperature of the wax or other substance contained therein, such substance will expand and act against the diaphragm within the casing 32 whereby to act through the fluid contained within the capillary 33 to force the plunger 29 from the casing of the actuator 30. A diaphragm is often disposed within the interior of the actuator casing to confine the capillary fluid at that end of the capillary and thereby prevent leakage of the fluid. In such cases, the fluid acts against the diaphragm which, in turn, acts against the plunger in the manner already described. Since remote sensing temperature responsive force transmitting devices of this general character are well known to those skilled in this art, it has not been felt necessary to further illustrate or describe the operation of such a unit.

If, while heated fluid is flowing through the valve 9, and the valve is in the position shown in FIGURE 1, and the temperature of the zone rises above that which is desired, say to 78° F., the sensing element 31 will cause the plunger 29 to be extended so as to move the end 27 of the sleeve 20 across the port 17 to stop the flow of heated fluid through the valve 10. When the temperature of the zone drops below that which is desired, say to 69° F., the sensing element 31 will allow the plunger 29 to be retracted so as to move the end 27 of the sleeve 20 away from the port 17, and allow heated fluid to flow through the port 17. Of course, while heated fluid is flowing through the valve 9, the outer sleeve 18 is maintained against the stop 26.

On the other hand, if chilled fluid begins flowing through the valve 10, the thermal element 14 retracts the plunger 22 as shown in FIGURE 2 to move an annular passage 34 in the sleeve 16 into registry with the passage 24 and a release passage 35, so as to provide an exit into the chamber 62 and out the port 61 for the fluid which is trapped in the space above the top surface 63 of the outer sleeve 18. The outer sleeve 18 is urged upward by the coil spring 25 against a shoulder 36 of a shaft 37 which is rotatably mounted in the cap 13. Metering of chilled fluid is accomplished by a lower edge 38 of the inner sleeve 20 as it is moved relative to a ring 46 to block the port 21 when the inner sleeve 20 is moved downwardly against the ring 46 by the return spring 41.

If, while chilled fluid is flowing through the valve 9, and the valve is in the position shown in FIGURE 2, and the temperature of the zone drops below that which is desirable say to 69° F., the sensing element 31 will cause the plunger 29 to be retracted, so as to move the end 38 of the sleeve 20 across the port 21, to stop the flow of chilled fluid through the valve 9. When the temperature of the zone rises above that which is desired say to 78° F., the sensing element 31 will cause the plunger 29 to be extended, so as to move the end 38 of the sleeve 20 away from the port 21, thereby allowing fluid to flow through the port 21.

Providing a by-pass 39 near the inlet 11 prevents fluid from standing idle in the inlet 11, regardless of the position of the sleeves 16, 18 or 20. The by-pass 39 has a small bore, so as to allow only a relatively small volume of fluid to pass therethrough. The by-pass 39 insures that the temperature of the fluid in the inlet 11 is substantially the same temperature as the fluid in the pipe (not shown) leading up to the inlet 11. That is to say, if fluid at a temperature of 190° F. (at a heat exchanger) is passing through a relatively long pipe prior to entering the inlet 12, the temperature of the fluid within the inlet 12 will be approximately 190° F., because the fluid is never allowed to stand idle in the pipe. Likewise, if fluid at 35° F. (at an air-conditioning system) is flowing to the inlet 12, the temperature of the fluid within the inlet 12 will be approximately 35° F.

The knob 40 is adjusted when it is desired to alter the aforementioned operation of the valve 9 either during summer control or winter control. For example, if during winter control, the room is warmer than desired (in spite of the fact that the temperature is at the recommended level) the knob 40 can be adjusted to move the inner sleeve 20 upward on the threaded shaft 28. This will block the first port 17 so that the port 17 will remain closed even when the plunger 29 is in its most retracted position, and regardless of the temperature at the sensing bulb 31. Likewise, if during summer control, the room is cooler than desired, the knob 40 may be rotated in the opposite direction, moving the sleeve 20 downward on the threaded shaft 28. This will close the fluid path existing through the second port 21, so as to prevent the flow of chilled fluid through the valve 9, regardless of the temperature at the sensing bulb 31.

Notice that a relatively stiff coil spring 41 loads the actuator thermostat so as to return the valve sleeve 20 when plunger 29 retracts. The coil spring 41 acts against a recess 43 in the shaft 42 and a recess 44 in a drive shaft 45 to which the knob 40 is secured. The shaft 42 and the recess 44 may be hexagonal or splined so as to allow free vertical movement of the shaft 42 relative to the drive shaft 45. A ring 52 positioned in a groove 53 in the drive shaft 45 prevents downward movement of the drive shaft 45 relative to the cap 13. An O-ring 54 prevents leakage of fluid between the cap 13 and the drive shaft 45.

Thus, it is observed, that the valve of the instant invention is fully automatic in its conversion from heating control to cooling control. There is no need for expensive replacement of this valve or adjustment of the valve, or adjustment of a thermostat in order to convert the valve from heating control to cooling control. Furthermore, the valve is provided with a unique sleeve arrangement which provides a simple and economical technique for controlling the flow of fluid through the valve during heating control and cooling control.

While the invention has been described with reference to a particular embodiment, other applications will be readily apparent to those skilled in the art. The invention therefore, should not be limited to the particular arrangement shown and described but all modifications within the spirit and scope of the appended claims.

I claim as my invention:
1. A fluid control valve comprising
   a valve body having an inlet and an outlet and a port communicating said inlet with said outlet,
   a sleeve having a side wall and having said side wall slidable within said port and having spaced inlet and outlet apertures formed within said side wall and communicable respectively with said inlet and said outlet,
   an end wall closing one end of said sleeve,
   a chamber formed between said end wall and a wall of said valve body,
   means biasing said sleeve in one axial direction,
   a passage communicating said inlet with said chamber, wherein said fluid directed through said passage to said chamber will act against said biasing means to urge said sleeve to move axially within said valve body, valve means controlling the introduction of fluid from said inlet to said passage, means sensitive to the temperature of fluid within said inlet for controlling the actuation of said valve means, a sleeve valve slidable along the inner wall of said sleeve between said inlet and outlet apertures and cooperable with said apertures to control the flow of fluid therethrough, manual adjusting means extending exteriorly of said body and having cooperation with said sleeve valve whereby to provide independent manual means for positioning said valve within said valve body, and independent means for effecting axial movement of said sleeve valve relative to said sleeve.

2. In a fluid control valve for alternately controlling the flow of fluid at a first temperature and a fluid at a second temperature:

a valve body including an inlet, an outlet, and a chamber in communication therewith, a first thermally sensitive element disposed in said inlet for sensing the temperature of the fluid entering therein, and having an operating piston extending therefrom movable to an extended position when fluid at the first temperature enters said inlet, and to a retracted position when fluid at a second temperature enters said inlet, an inlet sleeve concentric with and slidable against the inner surface of said inlet and having a closed end with ports therein, said closed end coupled to said operating piston, resilient means urging said inlet sleeve against said piston, said inlet sleeve having an annular groove in its outer surfaces, and having an aperture through one wall thereof, an outer sleeve in said chamber disposed substantially perpendicular to said inlet sleeve and having a first port and a second port therein, and having a closed end with spring retaining means thereon, a first portion of said chamber adjacent the outer surface of said closed end of said outer sleeve, stop means for said outer sleeve in said chamber opposite the open end of said chamber, spring means urging said outer sleeve toward said first portion of said chamber, passage means formed in said valve body from said inlet to said first portion of said chamber, said passage means located so that when fluid at the first temperature flows through said inlet, said aperture in said inlet sleeve is in registry with said passage diverting fluid to said first portion of said chamber to overcome said spring means and to move said outer sleeve against said stop means, and when fluid at the second temperature flows through said inlet, said annular groove is in registry with said passage, a relief port in said valve body adjacent said sleeve and extending to said chamber, said relief port located so as to be in registry with said annular groove when said operating piston is retracted, an inner sleeve concentric with and slidable against the inner surface of said outer sleeve, a second thermally sensitive element mounted in said valve body opposite the open end of said outer sleeve and having an operating plunger coupled to said inner sleeve and movable in response to the ambient temperature of the atmosphere, said operating plunger having a path which carries said inner sleeve from a position blocking said first port to a position away from said first port when fluid at the second temperature flows through said valve body, and having a path which carries said inner sleeve from a position blocking said second port to a position away from said second port when fluid at the first temperature flows through said valve body.

References Cited by the Examiner
UNITED STATES PATENTS

| | | | |
|---|---|---|---|
| 2,463,598 | 3/49 | Carson | 236—93 |
| 2,575,100 | 11/51 | Duey | 236—99 X |
| 2,631,781 | 3/53 | Dillman | 236—1 |
| 2,776,796 | 1/57 | Mosely | 236—1 |

EDWARD J. MICHAEL, *Primary Examiner.*